Patented Dec. 13, 1932

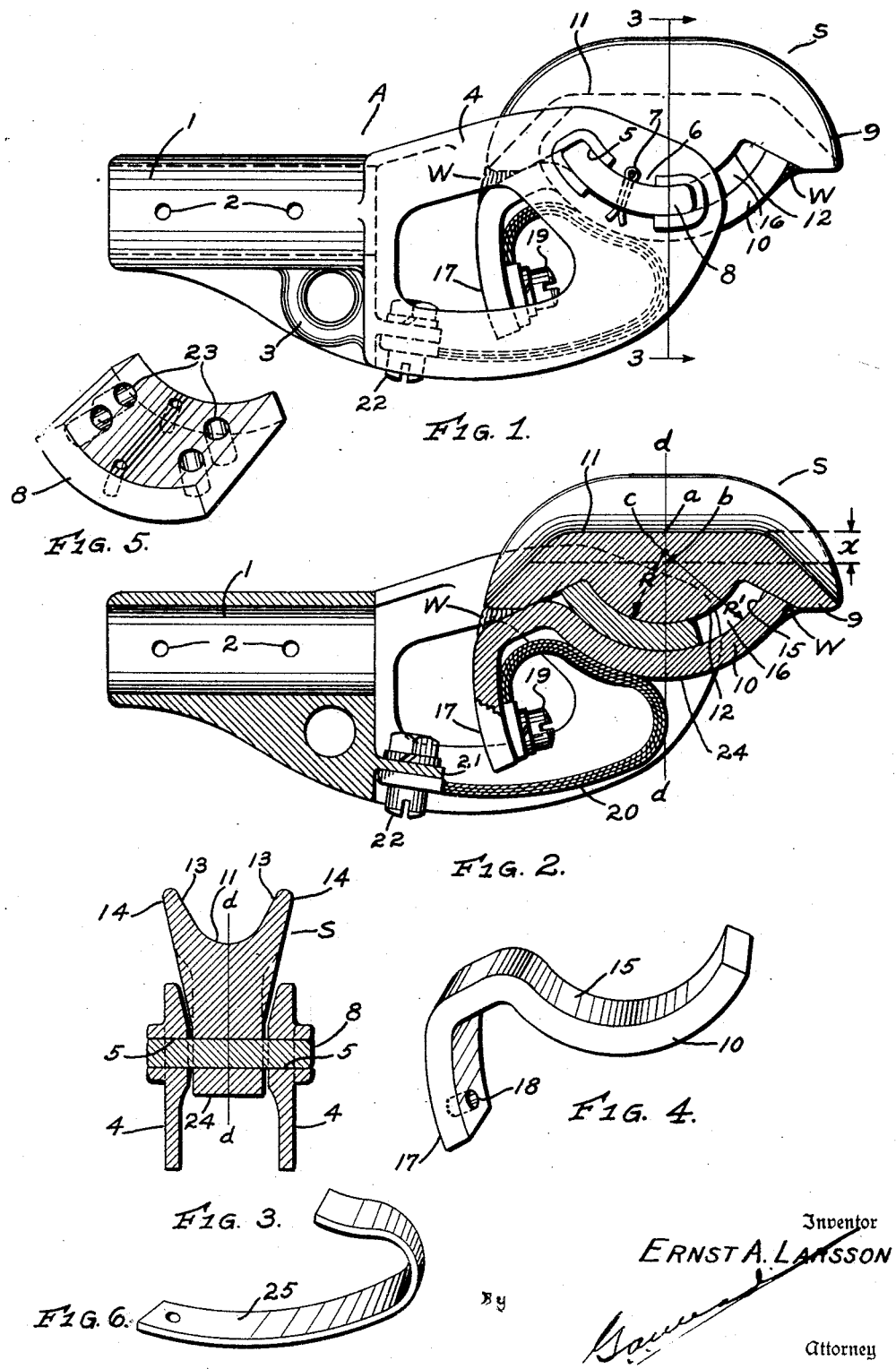

1,890,946

UNITED STATES PATENT OFFICE

ERNST A. LARSSON, OF MANSFIELD, OHIO, ASSIGNOR TO THE OHIO BRASS COMPANY, OF MANSFIELD, OHIO, A CORPORATION OF OHIO

TROLLEY HEAD

Application filed September 16, 1931. Serial No. 563,115.

My invention relates to trolley heads for current collectors and particularly of the sliding or shoe type.

The object of my invention is to provide a simple, economical, efficient device with large bearings and having parts which are easily renewable. Other advantages will be disclosed as I describe my invention.

My invention resides in the new and novel construction, combination and relation of parts described in this specification and shown in the drawing accompanying the same.

In the drawing:—

Fig. 1 is a side view of my invention.

Fig. 2 is a vertical, longitudinal section.

Fig. 3 is a transverse section on the line 3—3 of Fig. 1.

Fig. 4 is a retainer member later described.

Fig. 5 is a prospective view of the bearing I use.

Fig. 6 is a spring contact-conductor.

In the preferred embodiment of my invention I have a body member A having a socket portion 1 to receive a trolley pole and rivet holes 2 which receive rivets or pins to hold the member to the trolley pole.

An eye member 3 provides means to which a trolley rope may be attached.

The arms 4 project from the member 1 and are spaced apart and between which is mounted the shoe S.

The arms 4 are each provided with registering openings 5 of an arcuate shape. The arms 4 have a cutaway portion 6 and provide means for receiving the spring cotter 7.

Positioned in the arcuate openings 5 is an arcuate-shaped bearing 8 extending from arm to arm and provided with an opening at each end to receive a cotter 7 which prevents lateral displacement of the bearing 8. The bearing may be described as a rectangular segment of a cylinder having opposite parallel and arcuate bearing surfaces. The bearing may be moved into or out of its position by removing either cotter and sliding the bearing transversely of the arms 4.

The shoe S comprises two parts, namely, the shoe proper 9 and retainer 10. I prefer to form parts 9 and 10 separately because I find that the portion 9 which has a surface 11 engaging with a trolley wire and subjected to wear, should be made of a high carbon steel or an alloy steel hardened or heat-treated, or both. If both parts 9 and 10 are formed integral as by casting or forging and are then subjected to a hardening or heat-treating process then the member 10 due to the severe thermo stresses set up in the piece during the hardening operation is very liable to break. By making the member 10 separate from the member 9 and welding it thereto as indicated by W, I am able to produce the member 10 from ordinary low carbon bar steel.

Other advantages are secured by forming the parts 9 and 10 separately and then uniting them together, namely, the shape of the member 9 is such that it lends itself very readily to production by forging and, therefore, I am able to forge the member 9 from a high grade steel as previously stated and to dimensions required even to that of forming the bearing surface 12 sufficiently close that it will form the bearing surface with the member 8 without any machining operation and the surface 11 and inside surface 13 of the flanges 14 will merely require a polishing or light dressing with a carborundum wheel or buff after the member 9 has been hardened or heat-treated.

Also the member 10 is of such shape and construction that it can be forged very simply and cheaply to the desired shape and in this case the bearing surface 15 will be found such that it will operate with its bearing surface on the member 8 without further machining. In uniting the parts 9 and 10 I prefer to place in the arcuate slot 16 a form substantially a duplicate of the member 8 except its length is greater and then unite the parts by welding as at W by fusing the parts and applying thereto other fused metal from an electrode or from a rod fused by means of the oxy-acetylene flame.

A shoe S thus formed and assembled is very efficient, economical to produce and will work satisfactorily with the bearing member 8. The portion 9 will be hardened before assembly and the member 10 being produced of low carbon steel will not be subject to breakage, whether hardened or left soft.

The wear upon the contacting surfaces of the member 8 and the surfaces 12 and 15 is very slight compared with that on the surface 11 as the relative movement between the shoe S and the bearing 8 is one of a pivotal action and the movements as a rule are very short as will be readily appreciated.

The member 10 is provided with a nose 17 and the threaded hole 18 receives the cap screw 19 by means of which a braided ribbon conductor 20 is attached to the member 10. The other end of the braided ribbon 20 is attached to a lip 21 formed integral with the member A by means of a screw or bolt 22.

The bearing surface 11 of the shoe S is subject to great wear due to its sliding contact with a trolley wire, and, therefore, the shoe S is made with sufficient material to permit of considerable wear before the shoe must be discarded and the amount of wear is shown by $x$ between the dotted lines. In order to make the operation of the shoe uniform when moved in either direction relative to the trolley wire I make the bearing surfaces of the member 8 on a radius struck from the point $c$ on the shoe which is substantially midway between points $a$ and $b$. The point $c$ may represent the axis of rotation or oscillation of the shoe. If possible I would prefer to have the center of the radius coincide with the bearings or contact surface $a$ but this surface is constantly changing and the point $a$ finally becomes the point $b$, therefore, I compromise and make the center of radius R and R' on the axis of rotation and somewhere between the points $a$ and $b$ on the shoe S. Also I prefer to have the center of radius midway of the length of the contact surface 11 as, for instance, on the line $d-d$.

In Fig. 5 is shown a prospective view of the bearing 8 and also a plurality of openings in which is placed a lubricating composition 23 such as graphite and tallow. I also prefer to lubricate the bearing surfaces 12 and 15 with a thin coating of graphite and adhesive binder before assembly.

As a substitute for the conductor 20 I may use a leaf spring 25 of one or more leaves which will have one end secured to the lip 21 by the screw 22 and the free end engage the outer circular surface 24 of the member 10, thus the shoe will be free to pivot and the metal spring 25 conduct current and there will be no movement of the spring if the surface of contact 24 of the part 10 with the free end of the spring is formed with a fixed radius from the center $c$.

The shoe proper may be of chrome-nickel steel of about .35 carbon and the member 10 and bearing 8 may be of cold rolled steel .15 carbon.

Modifications will suggest themselves to those skilled in the art but I wish to be limited only by my claims.

I claim:—

1. A current collector comprising a harp member having means for attachment to a support and spaced arms, a current collecting member mounted between the arms and having an elongated contact surface between flanges and a transverse arcuate slot having parallel arcuate bearing surfaces having a common center of radii, the said center being positioned adjacent the said elongated contact surface and adjacent its longitudinal center and a bearing member positioned in said slot and secured to the arms and having oppositely disposed and parallel arcuate bearing surfaces conforming to those surfaces on the collector member.

2. A current collector comprising a harp member having means for attachment to a support and spaced arms, a current collecting member mounted between the arms and having an elongated contact surface to engage a trolley wire and a transverse arcuate slot having parallel arcuate bearing surfaces, one bearing surface being concave relative to the said elongated contact surface and a bearing positioned in said slot and mounted on said arms to support the collecting member, and having oppositely disposed parallel arcuate bearing surfaces conforming to said arcuate bearing, surfaces on the collecting member and upon which surfaces the collecting member oscillates.

3. A current collector comprising a member having means of attachment to a support and projecting means, a current collecting member mounted on the projecting means and having an elongated surface to engage a trolley wire, a projecting part on the collecting member having a convex arcuate bearing surface, a bearing member detachably secured to the same projecting means to support the collecting member and having a concave arcuate surface contacting with the said convex arcuate bearing surface of said projecting part on the current collecting member and upon which the collecting member pivots in a vertical plane and means engaging the surface of the bearing member opposite to the aforesaid bearing surface to prevent displacement of the collecting member.

4. A current collector comprising a harp member having spaced arms and means for attachment to a support, transverse registering arcuate slots in the arms, a transversely disposed bearing member having oppositely disposed parallel arcuate plane surfaces, positioned in the said slots and means to detachably secure the bearing in position, and a current collecting member having a transverse slot with opposite arcuate surfaces conforming to and cooperating with the arcuate bearing surfaces on the bearing member, the slot in the collecting member interlocked with the bearing member permitting the collecting member to oscillate relative to the harp member.

5. A current collector comprising a support member having spaced arms, transverse registering slots in the arms, a separately formed bearing positioned in said slots and means to prevent its displacement, a shoe member mounted upon the bearing and each having engaging arcuate bearing surfaces upon which they oscillate relative to each other, the shoe having a wire engaging elongated surface and the center of radius of the engaging arcuate bearing surfaces being located along the axis of oscillation of the shoe adjacent the said elongated surface.

6. A sliding shoe for a current collector provided with a contact surface to engage with and slide along a conductor and an elongated transverse arcuate slot, the opposite surfaces of the slot forming spaced parallel arcuate bearing surfaces the center of radii of which is located along the pivotal axis of the shoe within the limits of wear of the said contact surface and midway the length of the contact surface.

7. A sliding shoe for a current collector provided with a contact surface to engage with and slide along a conductor and an elongated transverse arcuate slot, the opposite surfaces of the slot forming spaced parallel arcuate bearing surfaces the center of radii of which is located along the pivotal axis of the shoe within the limits of wear of the said contact surface.

8. A current collector comprising a support, a shoe mounted in the support to oscillate relative thereto and having an elongated contact surface to engage a trolley wire, the shoe having an elongated transverse arcuate slot with spaced bearing surfaces to receive a bearing mounted on the support and upon which the shoe rests and oscillates relative to the support, the axis of oscillation coinciding approximately with the contact surface.

9. A sliding current collector comprising a ferrous member of alloy steel having a groove with an elongated surface to contact with a trolley wire and a separately formed member of low carbon steel welded to the ends of the ferrous member and forming therewith a transverse arcuate slot with parallel spaced surfaces.

10. A sliding shoe comprising an elongated ferrous member of heat-treated high carbon steel having a contact surface to engage with a trolley wire in sliding relation therewith and subject to wear, a separately formed member of other ferrous material secured to the ends of the ferrous member and forming therewith an elongated transverse slot, the opposite surfaces of the slot forming spaced parallel arcuate bearing surfaces the axis of oscillation of which falls within the limits of wear of the said contact surface.

11. A sliding current collector comprising a shoe of two separately formed metal parts, one part being of heat-treated steel and having a groove with an elongated contact surface subject to wear and also having an elongated arcuate convex bearing surface and the other part secured to the first part functioning to retain the shoe in position, an elongated bearing having opposite parallel faces of which one face is concave and engaged by the said convex bearing surface of the shoe and the other bearing face engaged by the said second part of the shoe and a support for the bearing to secure it to a trolley pole.

12. A current collector comprising a shoe having two separately formed parts of metal, one part provided with a contact surface along one side to engage a trolley wire and a convexed bearing surface on the opposite side forming an arc of a circle and upon which the shoe oscillates in a vertical plane relative to a bearing, the other part secured to the first part adjacent its ends and having a surface disposed opposite to that of the said convex bearing surface and spaced therefrom and forming therewith a transverse slot and a bearing positioned in the slot and having a concave surface conforming to and engaging with the said convex bearing surface on the said first part and means to support the bearing.

13. A current collector comprising a shoe having two separately formed parts of metal, one part provided with a contact surface along one side to engage a trolley wire and a curved bearing surface on the opposite side forming an arc of a circle and upon which the shoe oscillates in a vertical plane relative to a bearing, the other part secured to the first part adjacent its ends and having a surface disposed opposite to that of the said curved bearing surface and spaced therefrom and forming therewith a transverse slot and a bearing positioned in the slot and having a curved surface conforming to and engaging with the said curved bearing surface on the said first part and means to support the bearing.

14. A trolley harp comprising a part to secure the harp to a support and spaced arms projecting from the said part and a bearing positioned between the arms and having oppositely disposed parallel arcuate surfaces.

15. A trolley harp comprising a part to secure the harp to a support and spaced arms projecting from the said part and an elongated opening through each arm and registering with each other to receive a bearing member, each slot having oppositely disposed parallel arcuate faces and the curvature of the faces of the slots being in the same direction.

16. A current collector shoe comprising two separately formed parts of metal, one part having an elongated contact surface along one side, the other part welded to the first part with one end of each part adjacent and the other end of the first part intermediate the ends of the second part, the projecting portion of the second part forming a guard and the portion of the second part subtended by the first part forming therewith a transverse elongated slot to receive a support.

17. A current collector support comprising a member having means to secure the member to a support and spaced arms projecting from said means, a bearing secured between the arms and having oppositely disposed parallel arcuate surfaces arranged to be engaged by a collector shoe to prevent displacement of the shoe, one surface being concave and having uniform radii at all points.

18. A current collector comprising a harp having means to secure it to a support and spaced arms, a sliding shoe collector mounted between the arms to pivot about a fixed axis and having an elongated groove to contact with a trolley wire and an elongated arcuate slot to receive a bearing member extending between the arms and an exterior curved surface on the shoe the center of radius of which is the said axis of pivot and an auxiliary current carrying means having one end secured to the harp and the other end contacting with the said curved surface in movable frictional engagement therewith.

19. A current collector comprising a harp member having means for attachment to a support and spaced arms, a current collecting member mounted between the arms and having an elongated contact surface to engage a trolley wire and a transverse arcuate slot having parallel arcuate bearing surfaces, one bearing surface being concave relative to the said elongated contact surface and a bearing positioned in said slot and mounted on said arms to support the collecting member and having oppositely disposed parallel arcuate bearing surfaces conforming to said arcuate bearing surfaces on the collecting member and upon which surfaces the collecting member oscillates and a resilient current carrying member secured to the harp member and having a sliding engagement with the current collecting member.

20. A current collector comprising a support member having spaced arms, transverse registering slots in the arms, a separately formed bearing positioned in said slots and means to prevent its displacement, a shoe member mounted upon the bearing and each having engaging arcuate bearing surfaces upon which they oscillate relative to each other, the shoe having a wire engaging elongated surface and the center of radius of the engaging arcuate bearing surfaces being located along the transverse axis of rotation of the shoe and adjacent the said elongated surface, the shoe provided with a curved surface to be engaged by a current conductor and a resilient current conductor having one end secured to the support member and the other end bearing against the said curved surface.

21. A current collector comprising a harp member having spaced arms and means for attachment to a support, transverse registering arcuate slots in the arms, a transversely disposed bearing member having oppositely disposed parallel arcuate plane surfaces, positioned in the said slots and means to detachably secure the bearing in position, and a current collecting member having a transverse slot with opposite arcuate surfaces conforming to and cooperating with the arcuate bearing surfaces on the bearing member, the slot in the collecting member interlocked with the bearing member permitting the collecting member to oscillate relative to the harp member and a current conductor secured to the harp member and having a yielding sliding engagement with the current collecting member.

22. A trolley shoe support upon which to mount the shoe in pivotal relation to the support comprising a member having oppositely disposed and parallel bearing surfaces, the intermediate portion of the support arranged to support the shoe in sliding pivotal relation thereto about an axis spaced from the support and provided with depressions in the bearing surfaces filled with a lubricating material, the end portions of the support arranged to be mounted in a holder and means on the support to prevent unintentional displacement of the support in the holder, the bearing surfaces having the centers of radii located along the pivotal axis of the shoe.

23. A sliding shoe for a current collector, arranged to pivot relative to its support, comprising a member provided with an elongated contact surface positioned between spaced flanges to engage with and slide along a trolley wire and an elongated transverse arcuate slot, the opposite faces of the slot forming spaced and parallel arcuate bearing surfaces, the centers of radii of which are located along the pivotal axis of the shoe, one surface being convex and upon which the shoe is supported and the other surface being concave for retaining the shoe against displacement relative to its support and the shoe having means projecting in a direction away from the said elongated contact surface to prevent entanglement of the shoe with the trolley wire if dewired.

24. A current collector comprising in combination a support member, a current collecting member having an elongated contact surface to engage a trolley wire, one member provided with means having oppositely disposed faces forming spaced and parallel arcuate bearing surfaces, the other member provided with transversely disposed means having oppositely disposed faces forming spaced and parallel arcuate bearing surfaces cooperating with the aforesaid bearing surfaces to support the current collecting member relative to the support member and permitting the current collecting member to rock relative to the support about an axis at a distance from the said transversely disposed means and preventing the rotation of the current collecting member about an axis intersecting said transversely disposed means.

In testimony whereof I affix my signature.

ERNST A. LARSSON.